United States Patent

[11] 3,568,057

[72] Inventor Edmund Povey
 Medford, Mass.
[21] Appl. No. 770,321
[22] Filed Oct. 24, 1968
 Division of application Ser. No. 453,145,
 May 4, 1965, Patent No. 3,452,274.
[45] Patented Mar. 2, 1971
[73] Assignee Doble Engineering Company
 Belmont, Mass.

[54] PHASE MEASUREMENT APPARATUS INCORPORATING SQUARE WAVE VOLTAGE DIFFERENCE COMPENSATION
 6 Claims, 7 Drawing Figs.
[52] U.S. Cl. .................................................... 324/83,
 307/232, 307/237
[51] Int. Cl. ....................................................... G01r 25/00
[50] Field of Search ........................................... 324/83 (A),
 87; 307/237, 232; 328/133, 171

[56] References Cited
 UNITED STATES PATENTS
 2,923,884 2/1960 Moss ............................. 324/83(A)X
 3,193,771 7/1965 Boatwright ..................... 307/237X

*Primary Examiner*—Alfred E. Smith
*Attorney*—Willis M. Ertman

ABSTRACT: Apparatus for measuring the dielectric quality of electrical insulating oil includes a test cell for receiving the oil. The test cell includes two electrodes of a capacitor and a high value no loss capacitor is connected in series with the test cell, so that a sinusoidal voltage in quadrature with the current through the test cell is produced. A second sinusoidal voltage is provided across a zero phase angle standard resistor. Both sinusoidal voltages are converted to symmetrical square waves and a difference signal is produced by comparing the two square waves. The difference signal is integrated and applied to a meter to provide a direct indication of the loss characteristics of the oil being tested.

PATENTED MAR 2 1971

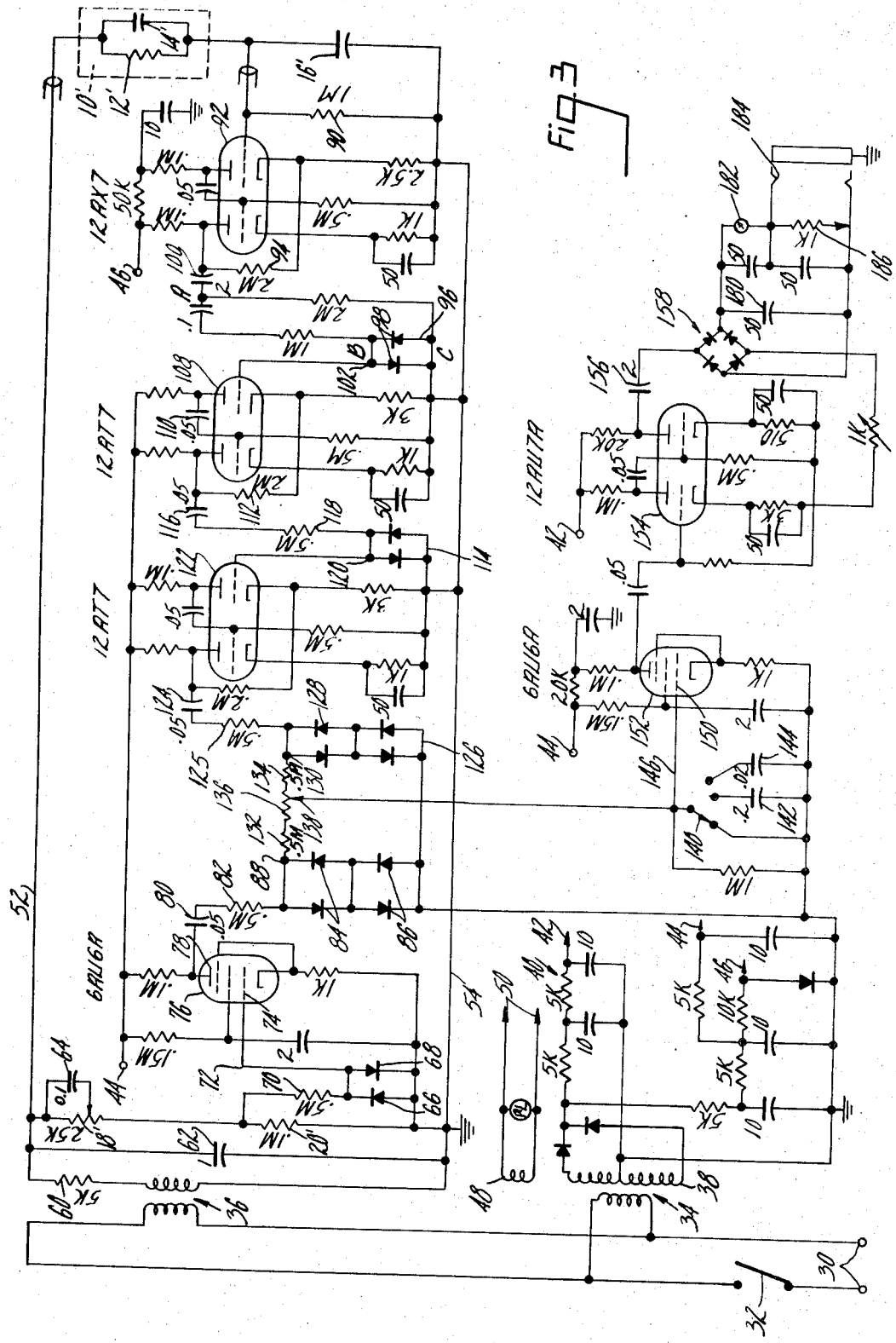

PHASE MEASUREMENT APPARATUS INCORPORATING SQUARE WAVE VOLTAGE DIFFERENCE COMPENSATION

This application is a division of application Ser. No. 453,145, filed May 4, 1965, now U.S. Pat. No. 3,452,274, entitled APPARATUS FOR MEASURING ELECTRICAL CHARACTERISTICS OF DIELECTRIC TEST SPECIMENS This invention relates to apparatus for measuring electrical characteristics and more particularly to apparatus for measuring the electrical loss characteristics of dielectric test specimens.

The dielectric quality of electrical insulating oil, of the type used in oil transformers and circuit breakers, for example, must be maintained at a high level, and therefore it is desirable to test the dielectric characteristic of the oil at regular intervals and/or to evaluate the life of the oil by accelerated oxidation testing. Measurements of oil specimens may be made between two electrodes immersed in the oil in a small test cell. The electrodes form a small capacitor, with the oil providing the dielectric. Frequently a loss characteristic, such as power factor or dissipation factor, provides sufficient information for evaluation of the oil specimen, such as in the measurement of the water content of the oil, see, e.g., Doble U.S. Pat. No. 2,807,956. It should be understood, however, that this invention is not limited to that particular application and that its scope includes the measurements of the loss characteristics of the many dielectrics and insulations which are well known in the art. It is an object of the invention to provide improved electric circuit arrangements particularly useful in such apparatus.

Another object of this invention is to provide novel and improved apparatus for use in the measurements of dielectric characteristics of dielectric test specimens.

Another object of the invention is to provide an improved phase measuring circuit particularly useful in the measurement of small differences in phase between two square waves.

A further object of the invention is to provide a novel and improved clipping circuit particularly useful in the measurement of loss characteristics of dielectric test specimens.

A further object of the invention is to provide novel and improved apparatus for analyzing the quality of electrical insulating oil.

Apparatus constructed in accordance with the invention is employed in a system for measuring the loss characteristics of a dielectric, includes a source of alternating voltage that is connected to charge a dielectric test specimen disposed between two electrodes of a capacitor of a test cell. A no loss capacitor of high value relative to that of the test cell may be connected in series with the test cell to establish a first sinusoidal output voltage in quadrature with the current through the test cell. A clipping circuit acts on the first output voltage to convert that sinusoidal voltage wave into an alternating voltage square wave of predetermined magnitude. There is also coupled to the source of alternating voltage, a zero-phase-angle standard resistor in parallel with said test cell and the capacitor. A second sinusoidal output voltage is derived across the resistor, in phase with the current through the resistor. There is also provided a second clipping circuit which acts on the second output voltage to convert that voltage to a second alternating voltage square-wave of the same magnitude. A comparing circuit senses the first and second square-wave voltages and produces a difference signal, directly related to the phase difference between said first and second square-wave voltages. An integrating circuit is coupled to said comparing circuit, and the output of the integrating circuit provides an indication of the phase difference between the current through the test cell and the current through the resistor, thereby providing a direct measurement of the loss characteristics of the dielectric in said test cell.

In the embodiments described hereinafter in greater detail, the comparing circuit includes a resistor element, and the difference signal is extracted from the center of the resistor element. One of the square-wave voltages is applied to one end of the resistor element and the other square-wave voltage is applied to the other end of the resistor element. To provide compensation for minor differences in the amplitude of the two square-wave voltages, a pair of asymmetrically conductive devices are connected in parallel, opposed orientation in series between the comparing circuit and the integrating circuit. Each of these asymmetrically conductive devices requires the application of a small but definite voltage in the forward direction before it will conduct, and therefore, this compensating circuit removes from the difference voltage, an error component due to small differentials between the magnitudes of the square-wave voltages applied to the comparing circuit.

The clipping circuits also employ a pair of asymmetrically conductive devices, similarly connected, in parallel opposed orientation, but in this case, the asymmetrically conductive device circuit is in parallel with the main signal path, and thus only that small voltage component that exists prior to the asymmetrically conductive device being placed in its forward conduction condition, is passed along the main signal path. A compensating circuit in this case of a resistive capacitive network is connected to the input of the clipping circuit. The compensation circuit is adjusted to have the same impedance characteristic as each asymmetrically conductive device in the clipping circuit when that asymmetrically conductive device is in forward conduction condition.

Other objects, features, and advantages of the invention will be seen as the following description of particular embodiments thereof progresses, in conjunction with the drawings in which:

FIG. 3 is a schematic diagram of circuitry constructed in accordance with the invention for measuring characteristics of dielectric test specimens;

Figure 1:
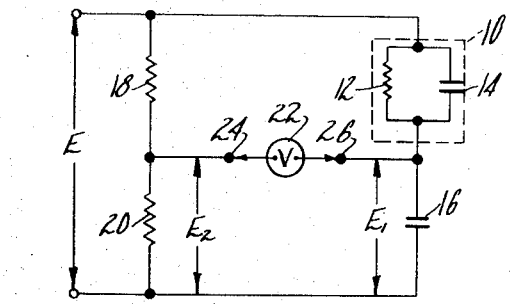
FIG. 1 is a schematic diagram of test apparatus for measuring characteristics of a dielectric test specimen.
Figure 2:
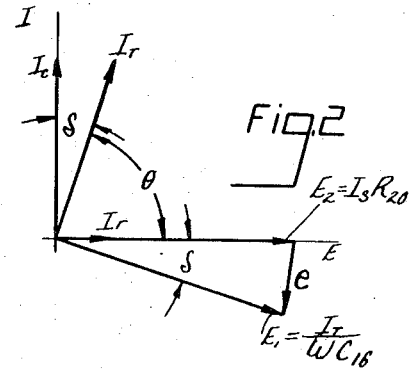
FIG. 2 is a vector diagram of electrical relationships that exist in the circuitry shown in FIG. 1.

With reference to FIG. 1, dielectric test specimen 10 can be represented by a resistor 12 in parallel with a no loss capacitor 14, the resistor 12 accounting for the loss in the dielectric, and the capacitor 14 being the capacitive value of the test specimen. This dielectric test specimen may be connected in series with a reference capacitor 16 across a voltage source $E$ to provide a first low voltage $E_1$. A second, or reference voltage $E_2$, may be derived from a resistor voltage dividing network of resistors 18 and 20 also connected across source $E$. The vector diagram shown in FIG. 2 indicates the current $I_t$ through the test specimen 10 consists of components $I_r$ and $I_c$. The current $I_r$ is in phase with the applied voltage $E$, while the current $I_c$ leads the applied voltage $E$ by 90°. The resulting current $I_t$ through the specimen leads the applied voltage $E$ by the phase angle $\theta$ of the dielectric. The loss characteristic of the dielectric may be designated by its power factor (cosine $\theta$) or by the sine of the defect angle $\delta$ as indicated in FIG. 2. The loss characteristic may be also designated as the dissipation factor—the cotangent of angle $\theta$ or tangent of the defect angle $\delta$.

The arrangement shown in FIG. 1 indicates a method for measuring the loss characteristic in terms of the defect angle $\delta$. This circuit applies the voltage $E$ across the network of the test specimen 10 and the no loss capacitor 16, to provide a first voltage $E_1$ and across the network of resistors 18 and 20 to provide the second voltage $E_2$.

The voltage $E_1$ is equal to current $I_t$ through capacitor 16 divided by $\omega C$ where $\omega$ equals 2W times the frequency of the applied signal and $C$ is the value of capacitor 16. This voltage lags $I_t$ by 90°. Similarly, the voltage $E_2$ equals the current $I_s$ through the resistor network times the value of resistor 20 and is in phase with that current. The phase angle between voltages $E_1$ and $E_2$ is the defect angle δ and the difference between voltages $E_1$ and $E_2$ is $e$ volts. With voltages $E_1$ and $E_2$ equal, by geometry, $e/2 = E_1 \sin δ/2$.

For small defect angles (up to about 10°) 2 sin δ/2 is approximately equal to sin δ, and sin δ = $^e E_1$. Hence the defect angle or percent power factor may be read directly by a volt motor 22 connected between terminals 24 and 26.

However, the condition necessary for this analysis is that voltages $E_1$ and $E_2$ are equal, and those voltages must be continually checked and adjusted as necessary to maintain the quality. Constant checking is particularly necessary in the measurement of the water content of oil as large changes occur in the capacitance of the test cell. Further, the voltmeter 22 is at a relatively high potential which provides disadvantages, both from the standpoint of safety and from the standpoint of simplifying the operation of an amplifier, if such is used in connection with either voltage $E_1$ or $E_2$.

As indicated above, the defect angle is a measurement of the difference in phase between the voltages $E_1$ and $E_2$. The instant invention provides a circuit for measuring this phase difference, without the necessity of maintaining equality between the voltages of $E_1$ and $E_2$. FIG. 3 shows a preferred embodiment of the invention, which includes terminals 30 to which a suitable energy supply is connected. Switch 32 controls the application of power to transformers 34 and 36. Transformer 34 has a 300 volt center tapped secondary winding 38, the center tap of which is grounded. A full wave rectifier circuit with smoothing filter circuits 40 provides rectified DC voltages at terminals 42, 44 and 46. Transformer 34 has another secondary winding 48 which supplies heater voltages at terminals 50 to the vacuum tubes.

The secondary winding of isolating transformer 36 (one-one ratio) produces between lines 52 and 54, an alternating signal corresponding to the voltage $E$ indicated in FIG. 1.

Resistor 60 and capacitor 62 function as a simple filter to substantially eliminate harmonics in the supply voltage and those introduced by transformers 34 and 36. The test specimen 10' and a capacitor 16' are between lines 52 and 54. Also connected across the lines 52 and 54 are a standard zero phase angle resistor 20' in series with an adjustable resistor 18'. (Capacitor 64 provides phase adjustment if necessary.)

A clipping circuit of two diodes 66 and 68, connected in opposed parallel arrangement, is connected in series with resistor 70 to the junction between resistors 18' and 20'. Because of the relatively high applied voltage, the clipping action of these diodes produces a truncated but nearly square AC voltage wave at point 72. In order to improve the shape of this voltage wave, it is applied to the control grid 74 of linear pentode amplifier 76, which amplifies the voltage wave and imparts a 180° phase reversal to the voltage wave. The plate 78 of pentode 76 is coupled by means of capacitor 80 and resistor 82 to a double clipping circuit consisting of two pairs of diodes 84, 86 in series. The output of the clipping circuit at point 88 is an essentially square wave voltage that is 180° out of phase with the input voltage appearing at point 72.

The current through test cell 10' is coupled to ground through a no loss capacitor 16', the capacitance of which is selected to produce a voltage across its terminals that is small compared to the voltage across the test cell, a typical value being in the order of 0.5 volt. A capacitor of 0.25 microfarad capacitance is well adapted for use with a typical oil test cell. A high resistance grid leak resistor 90 is connected in parallel with capacitor 16'. The voltage across capacitor 16' is so small that it frequently requires considerable amplification prior to clipping. For this purpose, two stages of amplification are provided by the twin triode 92, the plate circuit of the right triode section being capacitively coupled to the grid of the left triode section. A resistor 94 provides a negative feedback connection between the plate of the left section and the cathode of the right section triode to improve the linearity and to reduce the phase shift of the amplification stages.

A clipping circuit 96, including two parallel, opposed diodes 98, is also coupled to the plate circuit of the second triode stage via capacitor 100 so that at point 102 there appears a substantially square wave voltage that is in phase with the signal applied to the first triode stage. This square wave is amplified by the second dual triode 108 that is connected in the manner similar to tube 92, the capacitor 110 coupling the output of the first amplification stage to the input of the second amplification stage. A similar feedback resistor 112 is connected between the output of the second triode stage and the cathode of the first triode stage. A second dual diode clipping circuit 114, connected to the output of the tube 108 by capacitor 116 and resistor 118, provides an improved square wave output voltage at point 120 that is in phase with the signal applied to the input of tube 92. A third dual stage of amplification is provided by tube 122 connected in the same manner as tubes 92 and 108, and its output is connected by means of capacitor 124 and resistor 125 to series clipping circuits 126 and 128. The output of these clipping circuits (at point 130) is substantially a square wave in phase with the input signal applied to tube 92.

It will be observed that with reference to FIG. 1, the signals at the points 88 and 130 correspond to the signals at points 24 and 26 with a 180° phase shift having been imparted to the signal at point 88 by pentode 76. The amplitude characteristic of these signals has been removed, but the exact phase characteristics remain.

Connected between points 88 and 130 is an integration circuit that includes a resistor element having two main sections 132 and 134 and a finely divided center section 136, with which a slidable contactor 138 makes contact. Contactor 138 is connected via switch 140 directly to ground or through capacitor 142 or 144 to ground for controlling the amplitude of the signal on line 146 applied to the grid 150 of tube 152.

Figure 4:
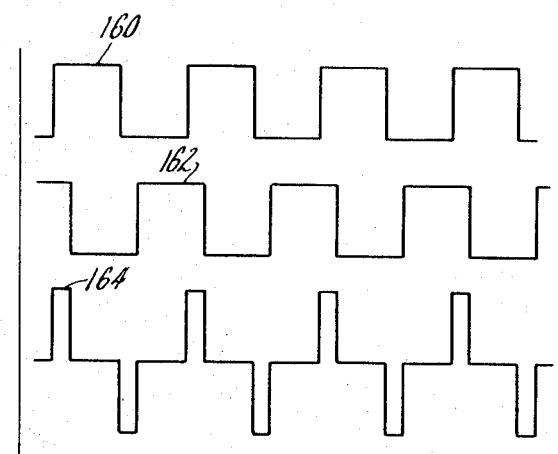
FIG. 4 is a graph indicating the operation of a circuitry shown in FIG. 3.

Referring to FIG. 4, the graph 160 represents a typical signal appearing at point 88 in FIG. 3; graph 162 is a typical signal appearing at point 130; and graph 164 represents the difference signal between these two points which appears at the slidable connector 138. Graph 160 corresponds to the phase of voltage $E_2$, FIG. 1, with a 180° phase shift; graph 162 corresponds to the phase of voltage $E_1$; and graph 164, a series of rectangular pulses, is the difference voltage which would normally appear at contactor 138. However, owing to the effect of either capacitor 142 or 144, graph 164 becomes an integrated wave and appears as such at point 146.

During most of each half-cycle when the signals at points 88 and 130 are equal and of opposite polarity, there is no net voltage acting on the integration circuit. However, due to small differences in characteristics of the diodes in the clipping circuits, the magnitudes of the square-wave voltages at points 88 and 130 may be somewhat unequal. These two magnitudes may be brought into equality with respect to the integrating circuit by the adjustment of contactor 138 relative to the finely divided resistor 136. Such an adjustment may be readily made by means of a cathode ray oscilloscope.

For a fraction of each half-cycle, depending on the defect angle of the test specimen, the signals at points 88 and 130 are of the same polarity, and together create the pulse which charges capacitor 142 and 144, as selected by switch 140. The signal on line 146 will depend on the amount of charge furnished to the capacitor, which in turn is related to the duration of the pulse, which in turn is related to the defect angle of the test specimen.

With reference again to FIG. 3, the signal on line 146 is applied to the control grid 150 of a pentode amplifier 152, the output of which is capacitively coupled to two further stages of amplification provided by dual triode 154. The output from the third stage of amplification is coupled by capacitor 156 to a full wave rectifier 158 (diode bridge-type). A capacitor 180 is connected across the output terminals of the rectifier to smooth the ripple in the rectified current wave, and that current is measured by a DC indicating instrument 182, the scale which may be calibrated in either power factor or dissipation factor or in parts of water in oil. In certain applications, such as measuring the parts of water in oil specimens, it is often desirable to obtain time records. This may be accomplished by connecting a recorder to the rectifier output circuit receptacle 184. When the recorder is plugged in, resistor 186 is open circuited so that the resistance of the rectifier output circuit remains unchanged.

In order to establish the correct phase relation between the currents through the standard resistor 20' and the test specimen 10', an adjustable phase shifting network consisting of a capacitor 64 connected between one end of resistor 18' and an adjustable slider thereon is provided, as indicated above. This adjustment may be accomplished by substituting a no loss capacitance for the test cell 10' and adjusting the slider on resistor 18' until the indication of the meter 182 is zero.

Figure 6:
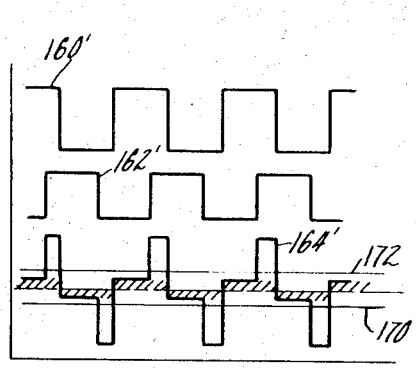
FIG. 6 is a second graph indicating a type of operation of the circuitry shown in FIG. 5.
Figure 5:
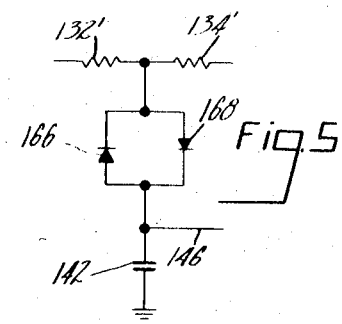
FIG. 5 is a schematic diagram of a modified circuit configuration.

A circuit modification which is particularly useful in connection with the measurements of low power factors (small phase differences), is shown in FIG. 5, and the effect of this circuit is indicated in FIG. 6. When the magnitudes of the voltages at point 88 and 130 are unequal, an error is introduced by the presence of the offset voltage, as indicated by the shaded portion in FIG. 6. If the area of the difference pulse above the shaded portion is small with respect to the area of the shaded portion between adjacent pulses, a substantial error may be introduced in the measurement. This error is practically eliminated by the circuit arrangement shown in FIG. 5, which includes the resistors 132' and 134'. The finely divided center section 136 is not now necessary, and therefore may be omitted. Two parallel opposed clipping diodes 166 and 168 are connected between the junction of resistors 132' and 134' and line 146. Each diode has a critical forward voltage as indicated by lines 170, 172 respectively in FIG. 6. The magnitudes of the pulses above these levels are equal, and only those portions (in excess of the forward conducting characteristics of the diodes 166 and 168) are applied to line 146. Therefore the meter 182 displays an accurate indication of the dissipation factor.

It may also be noted that the voltage appearing at point 130 is independent of the capacitance of the test specimen 10'. For example, an increase in that capacitance increases the current through capacitor 16' and the voltage amplified by tube 92 correspondingly increases. The clipping circuits, however, remove the effect of the variation in amplitude, and therefore the signal applied at point 130 is independent of the capacitance of the test specimen. It has been found that the phase effect of the clipping circuits may be improved by making the impedance characteristic between points A and B (FIG. 3) equal to the impedance between points B and C. Thus the output voltage at point 102 (point B) remains in phase with the voltage from the output of the amplifier (point A), regardless of the substantial changes in the magnitude of the output voltage, and in the capacitance of the test specimen. This latter circuit consideration is highly advantageous when the apparatus is used with a water meter, since the capacitance of the absorptive material may vary by a substantial amount as it absorbs more and more water.

Figure 7:
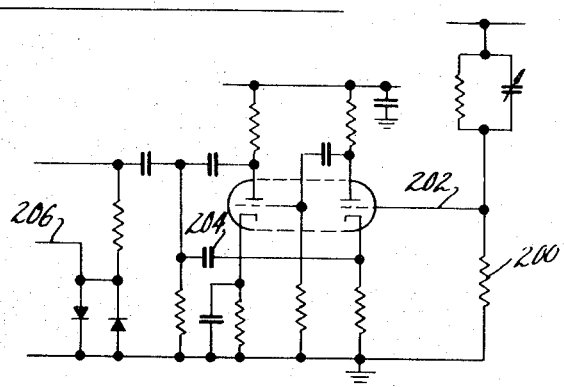
FIG. 7 is a schematic diagram of a portion of the circuitry shown in FIG. 3, indicating a modified form thereof.

In certain applications of the invention, it may be desirable to connect resistance rather than capacitance in series with the test specimen 10'. A circuit configuration of this type is indicated in FIG. 7. In that FIG., the capacitor 16' has been replaced by a resistor 200 which causes the voltage appearing at point 202 to be shifted 90° from its phase value in the arrangement shown in FIG. 3. Compensation for this phase displacement may be obtained by inserting capacitor 204 in the feedback circuit between the output of the second amplifier stage and the cathode of the first amplifier stage (in place of resistor 94). In this arrangement, the voltage at point 206 is then the same as the voltage at point 102 in the circuit in FIG. 3.

Thus it will be seen that the invention provides apparatus for measuring characteristics of dielectric test specimens and particularly the evaluation of insulating oil for the use of electrical apparatus in an accurate manner, which requires a minimum of compensating adjustments. While a particular embodiment of the invention, and modifications thereof, have been shown and described, still other modifications thereof will be obvious to those skilled in the art, and therefore it is not intended that the invention be limited to the disclosed embodiments, and departures may be made therefore within the spirit and scope of the invention as defined in the claims.

I claim:

1. In apparatus for the measurement of small differences in phase between two square waves of nearly equal magnitude including subtractor means for generating a difference signal, means for applying two square waves to said subtractor means, an integrating circuit, and an indicating circuit connected to said integrating circuit for indicating the difference in phase between said two square waves, the improvements comprising a pair of reverse connected asymmetrically conductive devices connected in series between said subtractor means and said integrating circuit, the magnitude of the voltage required for forward conduction of each said asymmetrically conductive device being greater than the difference between and less than the magnitude of either of said square waves.

2. The improvement of claim 1 wherein each said asymmetrically conductive device is a diode.

3. The improvement of claim 1 wherein said subtractor means includes a resistance element and said two square waves are applied at opposite ends of said resistance element.

4. In apparatus for measuring a phase characteristic of an alternating electric signal, a clipping circuit including a pair of reverse connected asymmetrically conductive devices connected in parallel with one another, means for applying an input signal to said clipping circuit to place one of said asymmetrically conductive devices in forward conducting condition, and an impedance connected in series with said pair of asymmetrically conductive devices, the phase characteristic of said impedance being equal to the phase characteristic of each of said asymmetrically conductive devices when the asymmetrically conductive device is in forward conducting condition so that the output signal of said clipping circuit remains in phase with the input signal to said clipping circuit.

5. The apparatus of claim 4 wherein each said asymmetrically conductive device is a diode.

6. The apparatus of claim 4 wherein said impedance is a resistive capacitive network connected to the input of said clipping circuit.